US012682551B2

(12) United States Patent
Li et al.

(10) Patent No.: US 12,682,551 B2
(45) Date of Patent: Jul. 14, 2026

(54) DATA PROCESSING METHOD AND SERVER BASED ON VOXEL DATA, MEDIUM AND COMPUTER PROGRAM PRODUCT

(71) Applicant: Shanghai Lilith Interactive Entertainment Network Technology Co., Ltd., Shanghai (CN)

(72) Inventors: Zhikai Li, Shanghai (CN); Huanhua Liao, Shanghai (CN); Xin Xiong, Shanghai (CN); Haonan Zhao, Shanghai (CN)

(73) Assignee: Shanghai Lilith Interactive Entertainment Network Technology Co., Ltd., Shanghai (CN)

( * ) Notice: Subject to any disclaimer, the term of this patent is extended or adjusted under 35 U.S.C. 154(b) by 254 days.

(21) Appl. No.: 18/698,205

(22) PCT Filed: Oct. 14, 2022

(86) PCT No.: PCT/CN2022/125332
§ 371 (c)(1),
(2) Date: Apr. 3, 2024

(87) PCT Pub. No.: WO2023/061474
PCT Pub. Date: Apr. 20, 2023

(65) Prior Publication Data
US 2025/0235781 A1 Jul. 24, 2025

(30) Foreign Application Priority Data

Oct. 15, 2021 (CN) .......................... 202111203126.5
Oct. 15, 2021 (CN) .......................... 202111203127.X

(51) Int. Cl.
*G06T 15/08* (2011.01)
*G06T 15/00* (2011.01)
*A63F 13/52* (2014.01)

(52) U.S. Cl.
CPC .............. *G06T 15/08* (2013.01); *G06T 15/00* (2013.01); *G06T 15/005* (2013.01); *A63F 13/52* (2014.09); *G06T 2210/52* (2013.01)

(58) Field of Classification Search
CPC ................................ G06T 15/00; G06T 15/08
See application file for complete search history.

(56) References Cited

U.S. PATENT DOCUMENTS

| | | | | |
|---|---|---|---|---|
| 2014/0176545 A1* | 6/2014 | Laine | ...................... | G06T 11/40 |
| | | | | 345/424 |
| 2015/0254877 A1* | 9/2015 | Bajic | .................. | G01R 33/5608 |
| | | | | 382/131 |
| 2015/0356788 A1* | 12/2015 | Abe | ...................... | A63F 13/335 |
| | | | | 345/633 |

OTHER PUBLICATIONS

International Search Report; China National Intellectual Property Administration; International Application No. PCT/CN2022/125332; Jan. 18, 2023; 8 pages.

* cited by examiner

*Primary Examiner* — Charles Tseng
(74) *Attorney, Agent, or Firm* — Taft Stettinius & Hollister LLP

(57) ABSTRACT

The present invention provides a data processing method and server based on voxel data, a medium, and a computer program product. Pixel data is converted into voxel data, and this is highly compatible with a GPU operation. Layer data and connection data are designed from the voxel data, and a parallel computing speed is faster by using the layer data and the connection data, so that compared with the existing CPU computing mode, the performance of the GPU-based data computing solution is 2 to 3 orders of magnitude higher than that of the CPU-based computing mode, making the AI algorithm more refined and higher anthropomorphic. In the dynamic update process, due to the fast parallel computing speed, the data of the global super-large map of the game can (Continued)

be quickly updated. The entire set of data is divided into static data that occupies a large memory and dynamic data that occupies a small memory, so that the video memory space occupied during the entire game process is small, and the time used to refresh the dynamic data each time is also extremely short, making the game smoother.

19 Claims, 3 Drawing Sheets

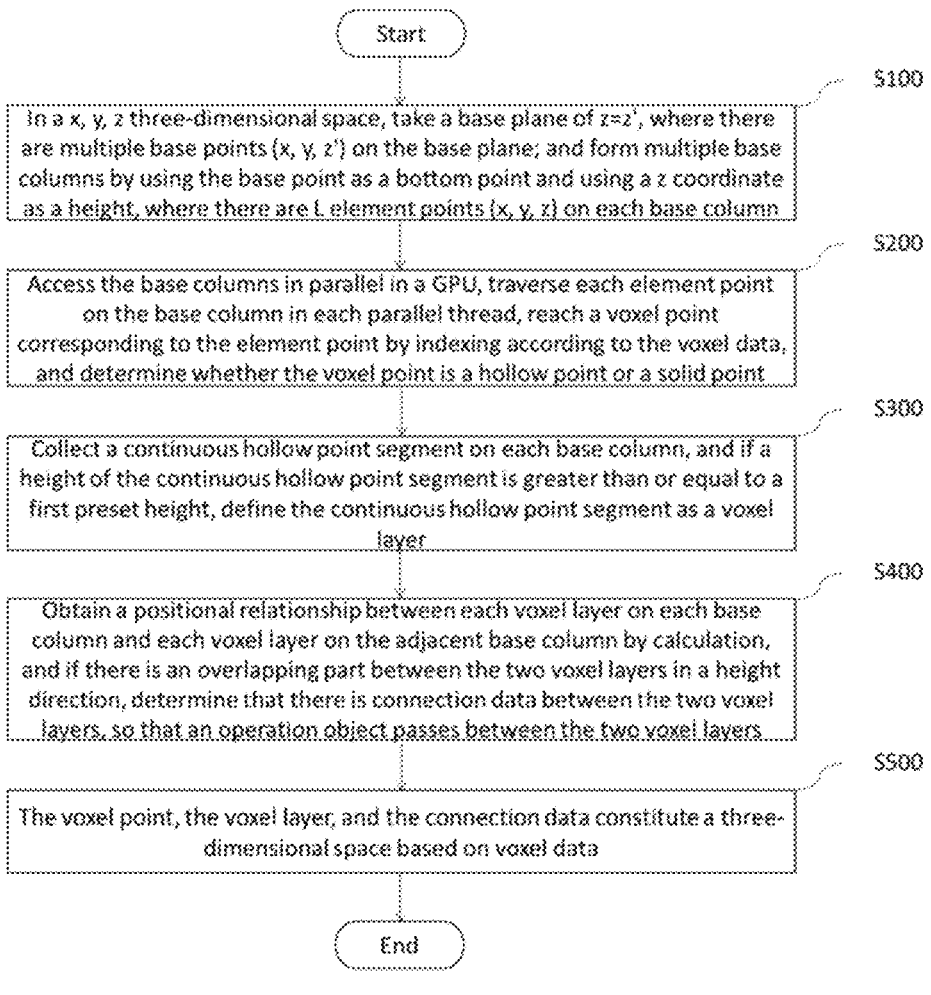

Start

S100

In a x, y, z three-dimensional space, take a base plane of z=z', where there are multiple base points (x, y, z') on the base plane; and form multiple base columns by using the base point as a bottom point and using a z coordinate as a height, where there are L element points (x, y, z) on each base column

S200

Access the base columns in parallel in a GPU, traverse each element point on the base column in each parallel thread, reach a voxel point corresponding to the element point by indexing according to the voxel data, and determine whether the voxel point is a hollow point or a solid point

S300

Collect a continuous hollow point segment on each base column, and if a height of the continuous hollow point segment is greater than or equal to a first preset height, define the continuous hollow point segment as a voxel layer

S400

Obtain a positional relationship between each voxel layer on each base column and each voxel layer on the adjacent base column by calculation, and if there is an overlapping part between the two voxel layers in a height direction, determine that there is connection data between the two voxel layers, so that an operation object passes between the two voxel layers

S500

The voxel point, the voxel layer, and the connection data constitute a three-dimensional space based on voxel data End

FIG. 1

DATA PROCESSING METHOD AND SERVER BASED ON VOXEL DATA, MEDIUM AND COMPUTER PROGRAM PRODUCT

CROSS-REFERENCE TO RELATED APPLICATIONS

This application is a U.S. National Phase of International PCT Application No. PCT/CN2022/125332 filed on Oct. 14, 2022, which claims priority to Chinese Patent Application Serial No. 202111203126.5 filed on Oct. 15, 2021, and Chinese Patent Application Serial No. 202111203127.X filed on Oct. 15, 2021. The contents of those applications are incorporated herein by reference in their entireties.

TECHNICAL FIELD

The present invention relates to the field of game data processing technologies, in particular to, a data processing method and server based on voxel data, a medium, and a computer program product.

BACKGROUND

A game scene is a collection of all scene elements in a virtual space in a video game, including contents such as map landforms, buildings, game characters, and equipment items. An interface of the game scene seen by a game user is often displayed in the form of a pixel scene, that is, the contents of the game scene are displayed on a display screen according to a pixel data format. In a multiplayer competitive game, there is a need to detect and determine the behavior action of characters in the game scene, and use functions such as game target object detection and path navigation, and therefore a large amount of data operations are involved. Especially when game objects move in certain scenes, there is a need to determine whether the three-dimensional space of the scene allows the game objects to pass through, and execute a large number of operations for three-dimensional spatial data.

In the existing technical means, logic determining in the above calculation tasks and preprocessing of image data before rendering are performed by a CPU. For competitive games with high real-time performance, calculation efficiency is low and business needs cannot be met.

SUMMARY

In order to overcome the above technical defects, an objective of the present invention is to provide a data processing method and server based on voxel data, a medium, and a computer program product with higher computing efficiency.

The present invention discloses a data processing method based on voxel data. The method includes the following steps:

in a x, y, z three-dimensional space, taking a base plane of z=z', where there are multiple base points on the base plane; and forming multiple base columns by using the base point as a bottom point and using a z coordinate as a height, where there are L element points on each base column;

accessing the base columns in parallel in a GPU, traversing each element point on the base column in each parallel thread, reaching a voxel point corresponding to the element point by indexing according to the voxel data, and determining whether the voxel point is a hollow point or a solid point;

collecting a continuous hollow point segment on each base column, and if a height of the continuous hollow point segment is greater than or equal to a first preset height, defining the continuous hollow point segment as a voxel layer; and obtaining a positional relationship between each voxel layer on each base column and each voxel layer on the adjacent base column by calculation, and if there is an overlapping part between the two voxel layers in a height direction, determining that there is connection data between the two voxel layers, so that an operation object passes between the two voxel layers; where the voxel point, the voxel layer, and the connection data constitute a three-dimensional space based on voxel data.

Preferably, if a height of the overlapping part is smaller than the first preset height, it is determined that the connection data is impassable connection data, and it indicates that the operation object cannot pass between the two voxel layers; and if a height of the overlapping part is greater than or equal to the first preset height, it is determined that the connection data is passable connection data, and it indicates that the operation object can pass between two voxel layers.

Preferably, the first preset height is greater than or equal to a height of the operation object, and the two voxel layers include a first voxel layer and a second voxel layer, a height of the lowest element point of the first voxel layer is n, and a height of the lowest element point of the second voxel layer is f, where if the height of the overlapping part is greater than or equal to the first preset height, and $f-n \leq a$ second preset height, it is determined that the passable connection data is first passable connection data, and it indicates that a passing manner in which the operation object passes from the first voxel layer to the second voxel layer includes a first passing manner and a second passing manner;

if the height of the overlapping part is greater than or equal to the first preset height, and the second preset height $< f-n \leq a$ third preset height, it is determined that the passable connection data is second passable connection data, and it indicates that a passing manner in which the operation object passes from the first voxel layer to the second voxel layer includes a third passing manner; and if the height of the overlapping part is greater than or equal to the first preset height, and the third preset height $< f-n \leq a$ fourth preset height, it is determined that the passable connection data is third passable connection data, and it indicates that a passing manner in which the operation object passes from the first voxel layer to the second voxel layer includes a fourth passing manner.

Preferably, the first passable connection data indicates that the passing manner in which the operation object passes from the first voxel layer to the second voxel layer further includes a fifth passing manner.

Preferably, the operation object has a first posture and a second posture, a posture height of the first posture is greater than a posture height of the second posture, and the operation object further has a first action manner and a second action manner, the first preset height is greater than or equal to the posture height of the second posture of the operation object, and the two voxel layers include a first voxel layer and a second voxel layer, a height of the lowest element point of the first voxel layer is n, and a height of the lowest element point of the second voxel layer is f, where if the height of the overlapping part≥the posture height of the first posture, and f−n≤a second preset height, it is determined that the passable connection data is fourth passable connection data, and it indicates that when the operation object passes from the first voxel layer to the second voxel layer, a posture of the operation object includes the first posture and the second posture, and an action manner of the operation object includes the first action manner;

if the posture height of the first posture>the height of the overlapping part≥the posture height of the second posture, and f−n≤the second preset height, it is determined that the passable connection data is fifth passable connection data, and it indicates that when the operation object passes from the first voxel layer to the second voxel layer, the posture of the operation object includes the second posture, and an action manner of the operation object includes the first action manner;

if the height of the overlapping part≥the posture height of the first posture, and the second preset height <f−n≤the third preset height, it is determined that the passable connection data is sixth passable connection data, and it indicates that when the operation object passes from the first voxel layer to the second voxel layer, the posture of the operation object includes the first posture, and an action manner of the operation object includes the second action manner; and if the posture height of the first posture>the height of the overlapping part≥the posture height of the second posture, and the second preset height<f−n≤the third preset height, it is determined that the passable connection data is seventh passable connection data, and it indicates that when the operation object passes from the first voxel layer to the second voxel layer, the posture of the operation object includes the second posture, and the action manner of the operation object includes the second action manner.

Preferably, the operation object further has a third action manner, where:

if the height of the overlapping part≥the posture height of the first posture, and the third preset height<f−n≤the fourth preset height, it is determined that the passable connection data is eighth passable connection data, and it indicates that when the operation object passes from the first voxel layer to the second voxel layer, the posture of the operation object includes the first posture, and the action manner of the operation object includes the third action manner.

Preferably, the operation object further has a third posture, a posture height of the third posture is less than the posture height of the second posture, and the first preset height greater than or equal to the posture height of the third posture of the operation object, where:

the fourth passable connection data indicates that when the operation object passes from the first voxel layer to the second voxel layer, the posture of the operation object further includes the third posture;

the fifth passable connection data indicates that when the operation object passes from the first voxel layer to the second voxel layer, the posture of the operation object also includes the third posture;

if the posture height of the second posture>the height of the overlapping part≥the posture height of the third posture, and f−n≤the second preset height, it is determined that the passable connection data is ninth passable connection data, and it indicates that when the operation object passes from the first voxel layer to the second voxel layer, the posture of the operation object includes the third posture, and the action manner of the operation object includes the first action manner.

Preferably, the method further includes the following steps:

calculating a navigation path through which the operation object passes from a starting-point voxel layer to an ending-point voxel layer in the three-dimensional space according to the connection data.

Preferably, the navigation path obtained by calculation is a path with a shortest distance or a smallest distance cost, and the distance cost is the cost required for the operation object to pass through a distance corresponding to the navigation path; or, the navigation path obtained by calculation is a path with a smallest action cost, and the action cost is the cost required for the operation object to take the passing manner; or, the navigation path obtained by calculation is a path that a sum of the distance cost and the action cost is smallest.

Preferably, the ending-point voxel layer includes a task-free ending-point voxel layer and a task-containing ending-point voxel layer, where:

a distance cost between a current position of the operation object and the task-free ending-point voxel layer is obtained by calculation in real time, and when the distance cost obtained by calculation is 0, it is considered that the operation object has reached the task-free ending-point voxel layer; and when the operation object triggers a task at the current voxel layer, it is considered that the task-containing ending-point voxel layer has been reached.

Preferably, the task includes a first task and a second task;

the task includes a first task and a second task; and that when the operation object triggers a task in the current voxel layer, it is considered that the task-containing ending-point voxel layer has been reached includes:

when a distance between the operation object and the target object does not exceed a preset distance and a ray detection result is passable, the first task is triggered, and the target object is an object capable of interacting with the operation object; and when a configuration parameter value of the operation object is lower than a preset configuration parameter value, and a current voxel layer in which the operation object is located has a configuration parameter supply for increasing the configuration parameter value, the second task is triggered.

Preferably, that when the configuration parameter value of the operation object is lower than a preset configuration parameter value, and a current voxel layer in which the operation object is located has a configuration parameter supply for increasing the configuration parameter value, the second task is triggered includes:

when the configuration parameter value of the operation object is lower than a preset configuration parameter value, and a current voxel layer in which the operation object is located has a configuration parameter supply, and when a result of ray detection between the operation object and the target object is impassable, the second task is triggered.

Preferably, the three-dimensional space based on voxel data is applied to a game scene, original data of the game scene constitutes a pixel scene, the pixel scene includes multiple different data types of scene elements, and the original data of the multiple types of scene elements is exported respectively;

> an expected side length of a unit voxel is set, and combined with a side length of the unit voxel, the original data of multiple types of scene elements is converted into voxel data respectively, where the voxel data represented in the game scene is represented as a voxel module; and
>
> according to relative positions of the voxel modules of all the scene elements in the pixel scene, the voxel modules of all the scene elements are spliced to obtain the voxel scene.

Preferably, the game scene includes a dynamic object, and types of all dynamic objects and offset coordinates of a contour point of each of different types of dynamic objects relative to a center point of the dynamic object are obtained;

> update coordinates of the refreshed contour point are obtained by calculation according to the coordinates of the center point of the refreshed dynamic object and the offset coordinates of the contour points;
>
> writing is performed at update positions of all contour points after the dynamic object is refreshed, and erasing is performed for original positions of all contour points before the dynamic object is refreshed, so as to complete dynamic refreshing of the dynamic object.

Preferably, the game scene further includes a static object;

> during the game, a set of static data composed of the static object is reused, and dynamic refreshing of the dynamic object is continuously performed, and dynamic data composed of the dynamic object before refreshing is discarded each time dynamic refreshing performed.

Preferably, the scene elements of the game scene include terrain, vegetation, a building, and an outdoor decoration; the exporting the original data of the multiple types of scene elements respectively includes:

> exporting 3D model file format data and coordinate information of the outdoor decoration and the building; exporting comma-separated value file format data of the vegetation; and orthogonally capturing by a depth camera to export a picture of the terrain, where the picture includes surface height data of the terrain; and
>
> the setting an expected side length of a unit voxel, and combined with the side length of the unit voxel, converting the original data of the multiple types of scene elements into voxel data respectively includes:
>
> converting the 3D model file format data of the outdoor decoration and the building into voxel data; obtaining a size of a collision body of the vegetation, combined with the side length of the unit voxel, obtaining a quantity of voxels that the vegetation needs to occupy in the voxel scene and a voxel shape by calculating; and according to the picture in which the surface height data of the terrain is stored, performing sampling point by point according to the side length of the unit voxel to convert the surface height data of the terrain into voxel data.

The present invention further discloses a data processing server based on voxel data, where the server includes a point capturing module, a comparison indexing module, a voxel layer data construction module and a connection data construction module;

> the point capturing module takes a base plane of z=z' in a x, y, z three-dimensional space, where there are multiple base points on the base plane; the point capturing module forms multiple base columns by > taking the base point as a bottom point and using a z coordinate as a height, where there are L element points on each base column;

the comparison indexing module accesses the base columns in parallel in a GPU, traverses each element point on the base column in each parallel thread, reaches a voxel point corresponding to the element point by indexing according to the voxel data, and determines whether the voxel point is a hollow point or a solid point;

the voxel layer data construction module collects a continuous hollow point segment on each base column, and if a height of the continuous hollow point segment is greater than or equal to a first preset height, defines the continuous hollow point segment as a voxel layer; and the connection data construction module obtains a positional relationship between each voxel layer on each base column and each voxel layer on the adjacent base column by calculation, and if there is an overlapping part between the two voxel layers in a height direction, determines that there is connection data between the two voxel layers, so that an operation object passes between the two voxel layers; where the voxel point, the voxel layer, and the connection data constitute a three-dimensional space based on voxel data.

The present invention further discloses a computer-readable storage medium, storing instructions for data processing based on voxel data, where the instructions implement the following steps when executed:

> in a x, y, z three-dimensional space, taking a base plane of z=z', where there are multiple base points on the base plane; and forming multiple base columns by using the base point as a bottom point and using a z coordinate as a height, where there are L element points on each base column;
>
> accessing the base columns in parallel in a GPU, traversing each element point on the base column in each parallel thread, reaching a voxel point corresponding to the element point by indexing according to the voxel data, and determining whether the voxel point is a hollow point or a solid point;
>
> collecting a continuous hollow point segment on each base column, and if a height of the continuous hollow point segment is greater than or equal to a first preset height, defining the continuous hollow point segment as a voxel layer; and
>
> obtaining a positional relationship between each voxel layer on each base column and each voxel layer on the adjacent base column by calculation, and if there is an overlapping part between the two voxel layers in a height direction, determining that there is connection data between the two voxel layers, so that an operation object passes between the two voxel layers; where
>
> the voxel point, the voxel layer, and the connection data constitute a three-dimensional space based on voxel data.

The present invention further discloses a computer program product, including a computer-executable instruction, where the instruction is executed by a processor to implement the following steps:

> in a x, y, z three-dimensional space, taking a base plane of z=z', where there are multiple base points on the base plane; and forming multiple base columns by using the base point as a bottom point and using a z coordinate as a height, where there are L element points on each base column;

accessing the base columns in parallel in a GPU, traversing each element point on the base column in each parallel thread, reaching a voxel point corresponding to the element point by indexing according to the voxel data, and determining whether the voxel point is a hollow point or a solid point;

collecting a continuous hollow point segment on each base column, and if a height of the continuous hollow point segment is greater than or equal to a first preset height, defining the continuous hollow point segment as a voxel layer; and obtaining a positional relationship between each voxel layer on each base column and each voxel layer on the adjacent base column by calculation, and if there is an overlapping part between the two voxel layers in a height direction, determining that there is connection data between the two voxel layers, so that an operation object passes between the two voxel layers; where the voxel point, the voxel layer, and the connection data constitute a three-dimensional space based on voxel data.

After adopting the above technical solution, compared with the prior art, the present invention has the following beneficial effects:

1. For calculation of pixel data, the pixel data is converted into voxel data, and this is highly compatible with a GPU operation. Layer data and connection data are designed from the voxel data, and a parallel computing speed is faster by using the layer data and the connection data; Compared with the existing CPU operation mode, the performance of the GPU-based data computing solution is 2 to 3 orders of magnitude higher than that of the CPU-based data computing mode, making the AI algorithm more refined and more anthropomorphic; passage between different voxel layers on different base columns and different layers of the adjacent base column is implemented by using the connection data, so that the movement of objects in the three-dimensional space is implemented.

2. During the dynamic update process, due to the fast parallel computing speed, the data of the global super-large map of the game can be quickly updated.

3. The entire set of data is divided into static data with a larger memory and dynamic data with a smaller memory, one set of static data and multiple sets of smaller dynamic data are reused during the game, and the last set of dynamic data is discarded each time refreshing is performed, so that the video memory space occupied during the entire game process is smaller, and the time used to refresh the dynamic data each time is also extremely short, making the game smoother.

4. Different pieces of connection data can support different passing manners. Because there are multiple passing paths composed of connection data between two fixed starting points and ending points, and different pieces of connection data support different passing manners, there are many combinations of passing manners between two fixed starting points and ending points, and the optimal combination of passing manners can be obtained by choosing the combination with the least cost.

BRIEF DESCRIPTION OF DRAWINGS

FIG. 1 is a flowchart of a data processing method based on voxel data provided by the present invention;

8

Figure 2:
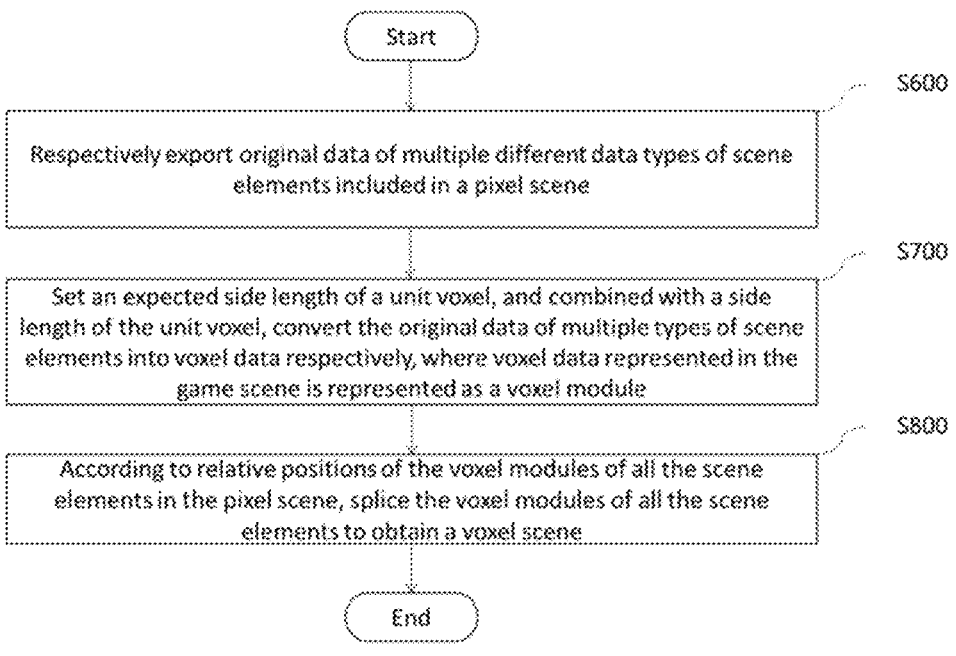
Figure 3:
Figure 4:
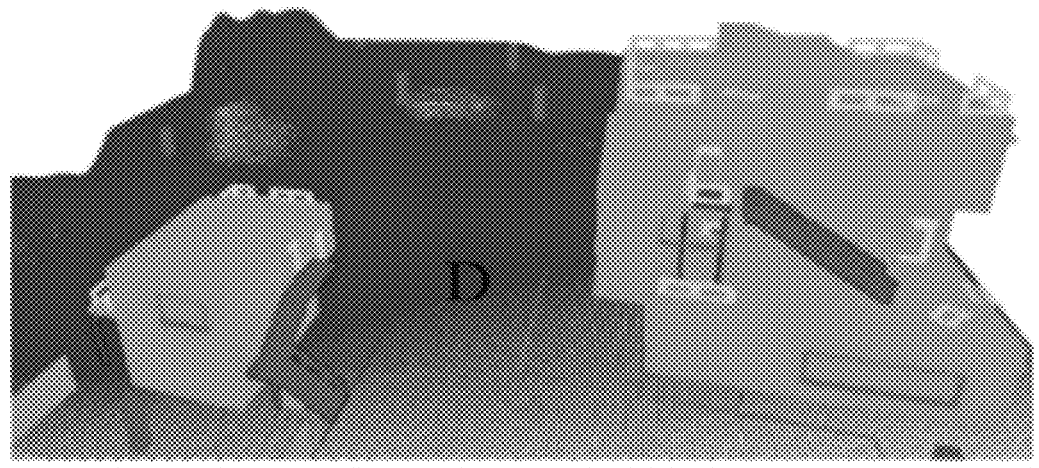
Figure 5:
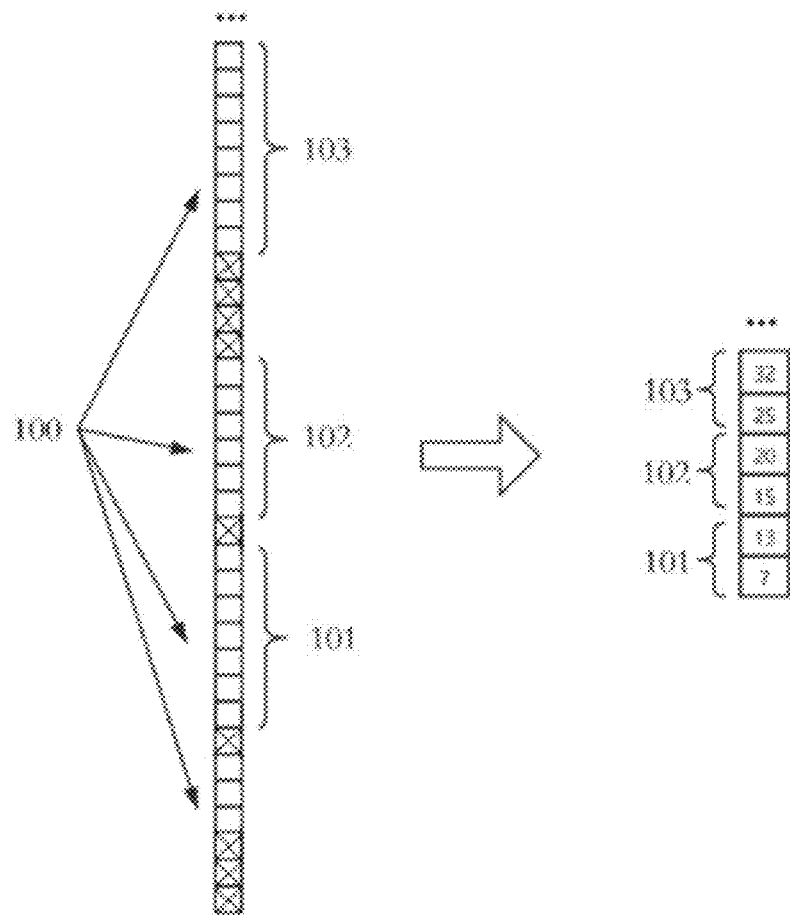

FIG. 2 is another flowchart of a data processing method based on voxel data provided by the present invention;

FIG. 3 is a pixel scene of the prior art;

FIG. 4 is a voxel scene converted from the pixel scene in FIG. 3 provided by the present invention; and FIG. 5 is a schematic diagram of an embodiment of construction of voxel layer data of one base column.

DETAILED DESCRIPTION OF EMBODIMENTS

Advantages of the present invention are further described below with reference to the drawings and specific embodiments.

The exemplary embodiments are described in detail herein, and examples thereof are shown in the accompanying drawings. When the following description involves the drawings, unless otherwise indicated, the same numbers in different drawings indicate the same or similar elements. The implementations described in the following exemplary embodiments do not represent all implementations consistent with the present disclosure. Rather, the implementations are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should further be understood that the term "and/or" as used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "while" or "in response to determining".

In the description of the present invention, it should be understood that the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, and are only for the convenience of describing the present invention and simplifying the description, and do not indicate or imply that the pointed device or element must have a specific orientation, or be constructed and operated in a specific orientation, and therefore cannot be understood as a limitation of the present invention.

In the description of the present invention, unless otherwise specified and limited, it should be noted that the terms "installed", "joint", and "connection" should be understood in a broad sense. For example, the connection can be a mechanical connection or an electrical connection, or may be internal communication between two elements, or may be a direct connection or an indirect connection through an intermediate medium. For the person of ordinary skill in the art, the specific meaning of the above terms can be understood according to specific conditions.

In the following description, use of suffixes such as "module", "component" or "unit" for denoting elements is only for facilitating description of the present invention and has no specific meaning. Therefore, "module" and "component" may be used in a mixed manner.

Referring to FIG. 1, the present invention discloses a data processing method based on voxel data, and a three-dimensional space based on the voxel data can be constructed. This method includes the following steps:

S100: In a x, y, z three dimensional space, a base plane of z=z' is taken, where there are multiple base points (x, y, z') on the base plane; multiple base columns are formed by using the base point as a bottom point and using a z coordinate as a height, where there are L element points (x, y, z) on each base column.

S200: The base columns are accessed in parallel in a GPU, each element point on the base column is traversed in each parallel thread, a voxel point corresponding to the element point is reached by indexing according to the voxel data, and it is determined whether the voxel point is a hollow point or a solid point.

S300: A continuous hollow point segment 100 on each base column (shown in FIG. 5) is collected, and if a height of the continuous hollow point segment 100 is greater than or equal to a first preset height, the continuous hollow point segment 100 is defined as a voxel layer.

S400: A positional relationship between each voxel layer on each base column and each voxel layer on the adjacent base column is obtained by calculation, and if there is an overlapping part between the two voxel layers in a height direction, it is considered that there is connection data between the two voxel layers, so that an operation object passes between the two voxel layers.

S500: The voxel point, the voxel layer, and the connection data constitute a three-dimensional space based on the voxel data.

The operation object in the three-dimensional space can stay in the voxel layer, and the connection data indicates that the operation object can pass between the two voxel layers. According to the connection data, a passing manner, or a passing posture and action manner of the operation object between the two voxel layers can be determined for the operation object, so that the operation object passes between the voxel layers.

Indexing can be understood as searching. When it is detected whether a voxel point is a solid point, the voxel point first needs to be "reached", and indexing is the step of "reaching". It can be understood as a proprietary step in computer processing.

Steps S100 to S300 correspond to an example of generating layer data according to voxel data of a target game scene area to obtain a voxel layer. The steps are applied to a game scene, the operation object is a game character, and a first preset height is the minimum height of the voxel layer. When a height of the operation object is equal to or less than the first preset height, it indicates that a height of the voxel layer is greater than or equal to a height of the game character, that is, the height of the voxel layer is enough to accommodate the game character.

For ease of understanding, the three-dimensional space based on the voxel data is regarded as a plane and columns on the plane, and each point on the plane has a column corresponding to the point. For the voxel data, there are hollow space voxel points and solid space voxel points on the column. For layer data, the column describes the space through which the game character can pass and the position of the game character.

Specifics are as follows:

1) In a XYZ three-dimensional voxel space with a resolution of i*w*h, a XY0 plane is taken when Z=0, and a resolution of this plane is i*w.

2) In this case, each point (x, y, 0) on the plane can be regarded as a base point in the three-dimensional space, and a base column with a height of h in a z direction is formed by the base point as a bottom point.

3) Coordinates of all points on the XY0 plane are put into a one-dimensional array A (a length is i*w), and the array A is input to a GPU.

4) In the GPU, calculation is simultaneously performed for the points in the array A, that is, i*w threads are concurrent, and each thread executes the following process:

a. For each base point (x, y, 0) on the XY0 plane, each element point on the base column using the base point as a bottom point and cycled from 0 to the highest point along a z direction is traversed.

b. The point in the voxel data is reached by indexing by using the coordinates in the voxel scene, and it is detected whether the point is a solid point or a hollow point.

c. A continuous hollow point segment is recorded, and it is determined whether the continuous hollow point segment can accommodate a height of a game character, and if yes, the continuous hollow point segment defined as a voxel layer.

d. A height of the lowest element point and a height of the highest element point are recorded for each voxel layer, and are used to indicate a position and a space size of the voxel layer.

e. All voxel layers on the column are recorded in the form of a one-dimensional array, thereby obtaining layer data in the entire three-dimensional space.

FIG. 5 is a schematic diagram of an embodiment of construction of voxel layer data of a base column provided by the present invention. Here, a bottom point of a base column is set to 0, a height of each element point is set to 1, and a first preset height is set to 5, and when a height of a continuous hollow point segment is greater than 5, the continuous hollow point segment is defined is a voxel layer. The left half of FIG. 5 shows an example of a base column, and the mark 100 represents a continuous hollow point segment, where: the lowest element point of a voxel layer 101 is 7, the highest element point is 13, and a height of the voxel layer is 7. The lowest element point of a voxel layer 102 is 15, the highest element point is 20, and a height of the voxel layer is 6. The lowest element point of a voxel layer 103 is 25, the highest element point is 32, and a height of the voxel layer is 8. As shown in the right half of FIG. 5, the lowest element point and the highest element point of all voxel layers of a base column are sequentially recorded in a one-dimensional array, thereby obtaining layer data. The layer data shown in FIG. 5 is only an embodiment, and the present invention is not limited thereto. For example, the lowest element point of the voxel layer and the height of the voxel layer can be recorded sequentially in a one-dimensional array to obtain the layer data.

For the construction of the connection data in step S400 in FIG. 1, there is a need to determine whether there is an overlapping part between the two voxel layers in the height direction according to the positional relationship between the voxel layers. If there is an overlapping part, it is considered that there is a possibility of establishing connection data between the two voxel layers, and the overlapping part is an area through which game characters can pass. The overlapping part as described herein includes cross-overlap and containment relationships.

Specifics are as follows:

1) A one-dimensional array of voxel layer data is stored for each point on a plane with a resolution of i*w.

2) All the points on the plane and voxel layer data stored for the points are put into an array B (the number of array elements is i*w, and each array element contains a layer data array), and the array B is input to a GPU.

3) In the GPU, calculation is simultaneously performed for the points in the array B, that is, i*w threads are concurrent, and each thread executes the following process:

a. For each point, voxel layer data of the point is read.

b. Four adjacent points of the point are read, voxel layer data of the four adjacent points is read, and connection data between all voxel layers on the point and all voxel layers of the adjacent points are constructed.

The construction method of the connection data between the two voxel layers is described below.

It is assumed that the two voxel layers are a first voxel layer and a second voxel layer, a height of the lowest element point of the first voxel layer is n, a height of the highest element point is m, a height of the lowest element point of the second voxel layer is f, and a height of the highest element point is e, where: if m≥e and e>n; or if e≥m and m>f, there is an overlapping part between the first voxel layer and the second voxel layer in the height direction, it is determined that there is connection data between the first voxel layer and the second voxel layer, so that the operation object can pass between the first voxel layer and the second voxel layer, that is, the operation object can pass between the first voxel layer and the second voxel layer in at least one passing manner, or the operation object can pass between the first voxel layer and the second voxel layer by using at least one posture and by combining at least one action manner.

When m≥e and e>n, if f>n, the first voxel layer includes the second voxel layer; if f<n, the first voxel layer overlaps with the second voxel layer.

When e≥m and m>f, if f<n, the second voxel layer includes the first voxel layer; if f>n, the first voxel layer overlaps with the second voxel layer.

Further, if a height of an overlapping part of the first voxel layer and the second voxel layer in the height direction is less than the first preset height, it is determined that the connection data is impassable connection data, and it indicates that the operation object cannot pass between the two voxel layers. In the present invention, the first preset height is the minimum height of the voxel layer, and can also be understood as the minimum height capable of accommodating the operation object. When the height of the overlapping part of the first voxel layer and the second voxel layer in the height direction is not enough to accommodate the operation object, it means that the operation object cannot pass between the first voxel layer and the second voxel layer. If the height of the overlapping part of the first voxel layer and the second voxel layer in the height direction is greater than or equal to the first preset height, that is, the height of the overlapping part of the first voxel layer and the second voxel layer in the height direction can accommodate the operation object, it is determined that the connection data is passable connection data, and it indicates that the operation object can pass between the two voxel layers.

According to an embodiment of the present invention, the first preset height is set to be greater than or equal to the height of the operation object. Here, for ease of understanding, this embodiment is described by using the first preset height as the height of the operation object.

If the height of the overlapping part is greater than or equal to the first preset height, and f−n≤the second preset height, it is determined that the passable connection data is first passable connection data, and it indicates that a passing manner in which the operation object passes from the first voxel layer to the second voxel layer includes a first passing manner and a second passing manner. In the present invention, the second preset height is set to be the maximum height that the operation object can cross when walking. For example, when the operation object encounters a step in the process of advancing, if a height of the step is less than or equal to the second preset height, the operation object can directly walk up the step, and if the height of the steps is greater than the second preset height, the operation object cannot walk on the step. It should be noted that "walking" in the present invention can be interpreted in a broad sense, "walking" can be walking in the usual literal sense, or can be running, or can be a moving manner in other postures other than upright walking, for example, squatting and crawling forward. Here, the first passing manner refers to walking upright, and the second passing manner refers to squatting. In addition, the first passable connection data can further indicate that the operation object can crawl from the first voxel layer to the second voxel layer, that is, a fifth passing manner. In addition, although the step is used as an example, the case of going uphill is also applicable.

If the height of the overlapping part is greater than or equal to the first preset height, and the second preset height <f−n≤a third preset height, it is determined that the passable connection data is the second passable connection data, and it indicates that the passing manner in which the operation object passes from the first voxel layer to the second voxel layer includes a third passing manner. In the present invention, the third preset height is set as the maximum height that the operation object can cross when jumping, for example, when the operation object encounters an obstacle in the process of advancing, if a height of the obstacle is less than or equal to the third preset height, the operation object can jump on (over) the obstacle. Here, the third passing manner is jumping.

If the height of the overlapping part is greater than or equal to the first preset height, and the third preset height<f−n≤a fourth preset height, it is determined that the passable connection data is third passable connection data, and it indicates that the passing manner in which the operation object passes from the first voxel layer to the second voxel layer includes a fourth passing manner. In the present invention, the fourth preset height is set as the maximum height that the operation object can cross when using items, for example, when the operation object encounters an obstacle in the process of advancing, if a height of the obstacle is less than or equal to the fourth preset height, the operation object can use an item, such as a jetpack, to climb on (over) the obstacle by jetting. Here, the fourth passing manner refers to jetting. It should be noted that the item is not limited to the jetpack, but may include a jumping vehicle, a mechanical armor, etc. The fourth passing manner can also refer to the passing manner in which climbing over is performed by using other items mentioned above.

Although only the situation in which the operation object passes from the first voxel layer to the second voxel layer is described in this embodiment, it can be easily known that this description can be extended to a case in which the operation object passes from the second voxel layer to the first voxel layer and any adjacent voxel layer.

According to another embodiment of the present invention, the operation object has a first posture and a second posture, a posture height of the first posture is greater than a posture height of the second posture. The operation object further has a first action manner and a second action manner, the first preset height is greater than or equal to the posture height of the second posture of the operation object. Here, the first posture means standing, the second posture means squatting, the first action manner means walking, and the second action manner means jumping. The operation object has different heights in different postures. For example, a height of a game character when standing is greater than a height of the game character when squatting. In this embodiment, the first preset height is set as the minimum posture height of the operation object, that is, the minimum height of the voxel layer is reduced, so that the operation object can pass between more voxel layers in more flexible and diverse ways.

If the height of the overlapping part≥the posture height of the first posture, and f−n≤the second preset height, it is determined that the passable connection data is fourth passable connection data, and it indicates that when the operation object passes from the first voxel layer to the second voxel layer, the operation object can walk in a standing posture, or walk in a squatting posture.

If the posture height of the first posture>the height of the overlapping part≥the posture height of the second posture, and f−n≤the second preset height, it is determined that the passable connection data is fifth passable connection data, and it indicates that when the operation object passes from the first voxel layer to the second voxel layer, because the height of the overlapping part cannot accommodate the operation object in a standing posture, the operation object can walk in a squatting posture.

If the height of the overlapping part≥the posture height of the first posture, and the second preset height<f−n≤the third preset height, it is determined that the passable connection data is sixth passable connection data, and it indicates that when the operation object passes from the first voxel layer to the second voxel layer, the operation object can jump in a standing posture. In addition, because the height of the overlapping part can accommodate the operation object in the standing posture and the squatting posture, if the game is set to be that the operation object can jump while in the squatting posture, the sixth passable connection data can also indicate that the operation object can jump in the squatting posture to pass from the first voxel layer to the second voxel layer.

If the posture height of the first posture>the height of the overlapping part≥the posture height of the second posture, and the second preset height <f−n≤the third preset height, it is determined that the passable connection data is seventh passable connection data, and it indicates that when the operation object passes from the first voxel layer to the second voxel layer, because the height of the overlapping part cannot accommodate the operation object in the standing posture, the operation object can jump in the squatting posture.

The operation object can further have a third action manner. The third action manner can be jetting by using a jetpack, or jumping over with items such as a jumping vehicle and a mechanical armor. For ease of understanding, jetting is taken as an example for illustration. If the height of the overlapping part≥the posture height of the first posture, and the third preset height <f−n≤the fourth preset height, it is determined that the passable connection data is eighth passable connection data, and it indicates that when the operation object passes from the first voxel layer to the second voxel layer, the operation object can perform jetting in a standing posture. In addition, because the height of the overlapping part can accommodate the operation objects in the standing posture and the squatting posture, if the game is set to be that the operation object can perform jetting while in the squatting posture, the eighth passable connection data can also indicate that the operation object can perform jetting in the squatting posture to pass from the first voxel layer to the second voxel layer.

The operation object can further have a third posture, the third posture refers to a crawling posture, a posture height of the third posture is less than the posture height of the second posture, and the first preset height is greater than or equal to the posture height of the third posture of the operation object, that is, here, the first preset height is further reduced and is set to be the height of the crawling posture, so that more voxel layers can be set in the voxel scene, where:

the fourth passable connection data may further indicate that the operation object can walk from the first voxel layer to the second voxel layer in a crawling posture;

the fifth passable connection data may further indicate that the operation object can walk from the first voxel layer to the second voxel layer in a crawling posture;

if the posture height of the second posture>the height of the overlapping part≥the posture height of the third posture, and f−n≤the second preset height, it is determined that the passable connection data is ninth passable connection data, and it indicates that when the operation object passes from the first voxel layer to the second voxel layer, the operation object can walk in a crawling posture. According to this embodiment, because the first preset height is set to be the minimum posture height of the operation object, more voxel layers can be set in the voxel scene, so that the operation object can pass between more different voxel layers with different heights in a more flexible and changeable manner, so that the fun of the game is increased.

Although three postures of standing, squatting, and crawling and three action manners of walking, jumping, and jetting are listed in this embodiment that the operation object, the present invention is not limited thereto. The person skilled in the art can easily know that more flexible and diverse postures and action manners may be set in the game, various postures can have different posture heights, different action manners can have different leaping abilities, and different passable connection data are set to be corresponding to combinations of different postures and action manners, and this represents various passing manners between voxel layers, and the above change manners are all within the protection scope of the present invention.

In addition, the above embodiments mainly discuss a case in which the lowest element point of the second voxel layer is higher than the lowest element point of the first voxel layer, that is, the operation object needs to jump over an obstacle with a certain height when moving from a low place to a high place. However, it is easy to understand that when the operation object travels from a high place to a low place, as long as the height of the overlapping part can accommodate the operation object, the operation object can pass in any passing manner or action manner.

A voxel (a portmanteau of the words volumetric and pixel) is a volume element, and a volume described as voxels can be visualized either by volume rendering or by the extraction of polygon iso-surfaces that follow the contours of given threshold values. A voxel is a smallest unit of digital data in division of a three-dimensional space, and the unit voxel mentioned in the present invention can be understood as a single voxel. Voxels are used in fields such as 3D imaging, scientific data, and medical imaging, and is conceptually analogous to a pixel, which is the smallest unit of a two-dimensional space, and the pixel is used in image data of a two-dimensional computer image. Some true 3D displays use the voxels to describe their resolution, for example, a display that can display 512×512×512 voxels.

In the field of 3D imaging technologies, a CPU-based computing mode is usually adopted, that is, various logical task operations and data preprocessing are performed on a CPU. However, a GPU is more suitable for concurrent data operations, such as image rendering. The combination effect of the existing spatial data structure and the GPU is not ideal, and the existing spatial data structure takes pixel data as the mainstream, and consequently the high-concurrency computing performance of the GPU cannot be reflected. In the present invention, the pixel data used for 3D imaging is converted into voxel data, which is highly compatible with the high-concurrency computing characteristics of the GPU, and various operations are performed. Compared with the existing CPU computing mode, the performance of the GPU-based data computing solution is 2 to 3 orders of magnitude higher than that of the CPU-based data computing mode. Therefore, the voxel data is used for high-performance spatial data calculation to sense the environment, and calculation efficiency is high.

In the world of voxel data, 1 represents a solid point, and 0 represents a hollow point. A representation of an object in the world of voxel data is a series of 1 at certain positions. To write an object means to write 1 to multiple certain positions in the world of voxel data; to erase an object means to write 0 to multiple certain positions in the world of voxel data.

Specifically, referring to FIG. 2, the present invention further provides a data processing method based on voxel data, a pixel scene can be converted into a voxel scene. This method further includes the following steps:

S600. Original data of multiple different types of scene elements included in the pixel scene are respectively exported.

S700. An expected side length of a unit voxel is set, and combined with a side length of the unit voxel, the original data of multiple types of scene elements is respectively converted into voxel data, where the voxel data is represented as a voxel module in the game scene.

S800. According to relative positions of the voxel modules of all scene elements in the pixel scene, the voxel modules of all the scene elements are spliced to obtain the voxel scene.

The voxel scene is a specific scene application of a three-dimensional space based on voxel data, which is a three-dimensional space composed of unit voxels, and in the three-dimensional space, each spatial element is represented by a unit voxel.

In this embodiment, the game scene is a game world created by a UE4 game engine, and the game is an electronic game that can be run on a device such as a mobile phone, a tablet computer, and a computer. Referring to FIG. 3, in the game world, the scene element includes terrain, vegetation, buildings, and outdoor decorations. The terrain may be such as slopes, hills, and rivers. The vegetation may be such as trees, flowers and grass, and shrubs. The buildings may be such as houses and warehouses. The outdoor decorations may be such as oil tanks and platforms. All scene elements in FIG. 3 are displayed in the form of pixels, and each element is composed of pixel blocks, that is, the game scene is described and displayed by using pixel data, and the pixel scene is a way of expressing the game scene.

However, data types used by different scene elements are different when the scene elements are constructed. According to the types and characteristics of the scene elements, the original data of different scene elements are exported from a UE4 game engine in different ways. Specifics are as follows:

The outdoor decorations and the buildings belong to an Actor-type containing StaticMesh in the UE4 game engine, OBJ files can be directly exported, and the coordinate information of Actor is synchronously exported; OBJ files are 3D model files.

The vegetation does not belong to an independent Actor type in UE4. Therefore, coordinates and a shape need to be recorded, and the coordinates and the shape are exported as a CSV information file. The CSV information file is a comma-separated value file.

Only surface height information is used for the terrain in the voxel world, and terrain image data can be exported by adopting a method of orthogonally shooting with a depth camera in the present invention.

The export methods of the multiple types of original data can be implemented by referring to the description document of the UE4 game engine, and are the technical means mastered by persons skilled in the art.

Because of different types of scene elements and respective characteristics, different conversion methods are required to convert various types of original data of different scene elements into voxel data represented as voxel modules in the game scene. First, an expected side length of the unit voxel needs to be set, a voxel module includes one or multiple unit voxels, and combined with the side length of the unit voxel, the original data of multiple types of scene elements are respectively converted into voxel data. Specifics are as follows:

For an OBJ (3D model) file, the OBJ file may be directly converted into a voxel module with the help of a "read_triangle_mesh" (read_triangle_mesh) function and a "create_from_triangle_mesh" (create_from_triangle_mesh) function in an open source library OPEN3D. OPEN3D is not an open source library limited by the present invention, and other open source libraries that can implement the above two functions can also be used for data conversion.

For the vegetation, according to a size of a collision body of the vegetation and the side length of the voxel, the number of voxel modules that the vegetation occupies in the voxel world and a shape of the voxel module need to be directly obtained by calculation.

The terrain occupies only one layer in the voxel scene. Referring to an area D in FIG. 4, according to image data in which height information is stored, point-by-point sampling is performed according to the side length of the unit voxel to convert the height information into voxel data (voxel module).

So far, all the data for building the voxel scene has been obtained, and finally the voxel modules of all scene elements need to be spliced to obtain the voxel scene of all scene elements.

The voxel scene is represented as a large number of three-dimensional coordinate points in the program. The principle of splicing the voxel modules is actually to integrate the coordinate point information representing the voxel modules into the same data structure according to the relative positions of the voxel modules in the game map. However, the UE4 game engine contains position information and rotation information of each module. Therefore, when splicing is performed, special attention needs to be paid to a problem that rules of Euler angle rotation transformation of the 3D model are inconsistent in different systems.

After splicing, the voxel scene shown in FIG. 4 is obtained. In this voxel scene, three-dimensional tensors are used to fully express spatial information of the three-dimensional world, sampling accuracy determines the spatial resolution, and the voxel data is used to record the game scene, that is, the voxel scene is a representation of the game scene. The format of the voxel data is standardized and tidy, and calculation, especially parallel calculation, is easily performed. Therefore, the voxel data is applied to the GPU operation in the present application, and high-speed multi-path concurrent operation can be implemented. It can be understood that in the GPU, the time for performing multi-path detection by using the voxel data is the same as the time for performing one-path detection, and therefore the time for performing multi-path detection can be greatly shortened. That is, the GPU can be used to carry out data calculation tasks at multiple coordinate positions in the three-dimensional space at the same time.

In another embodiment, the voxel scene can further be another application scene. In this another application scenario, the scene elements not only include terrain, vegetation, buildings and outdoor decorations, or may be other scene elements different from terrain, vegetation, buildings and outdoor decorations. Correspondingly, data export of the other scene elements and conversion of the voxel data may adopt a method different from this embodiment. This is not limited herein.

As an application of the voxel scene, in the game scene, types of all dynamic objects, and offset coordinates of a contour point of each of different types of dynamic objects relative to a center point of the dynamic object are obtained. According to the coordinates of the center point of the refreshed dynamic object and the offset coordinates of the contour point of the refreshed dynamic object, update coordinates of the refreshed contour point are obtained by calculation. Writing is performed at update positions of all contour points after the dynamic object is refreshed, and erasing is performed at original positions of all contour points before the dynamic object is refreshed, so that dynamic refreshing of the dynamic object is completed.

The coordinates of the contour points are the coordinates of the contours that make up the object, and the writing of the object is to write 1 at the positions of multiple contour points.

For example, if coordinates of a center point of an airdrop in the game are (10.10.30), and coordinates of one of the contour points of the airdrop are (0.20.50), offset coordinates of the contour point relative to the center point are (−10.10.20). If coordinates of the center point of the airdrop after refreshing are (10.10.25), coordinates of the contour point after refreshing is (0.20.45). 1 is written at the position (0.20.45) of the refreshed contour point, and 0 is written at the original position (0.20.50). If multiple contour points that make up the airdrop are refreshed at the same time, refresh of the position of the airdrop is refreshed.

By using voxel data, even global erasing and writing can be implemented in parallel on the GPU, and the real-time refreshing of the world can be completed at a high speed at the level of 10 microseconds (0.01 milliseconds).

The game scene includes a dynamic object and a static object. The static object refers to data of objects that are not affected by the game process, such as terrain, rivers, trees, indestructible buildings, and immovable objects in a game map. The dynamic object refers to the data of objects that game characters, vehicles (for example, vehicles and tanks), airdrops, and other objects whose shape and position change as the game progresses.

Multiple rounds of game running on a server are all on the same map, and all game rounds share one piece of static data in this case. Because the static data requires high-speed access and real-time processing, a memory and a video memory need to be occupied. For example, in the voxel scene, the voxel data in the static data is about 2 GB, the layer data is about 2 GB, and the connection data is about 4 GB, a total of 8 GB. If the static data is not reused, the storage cost is too high.

Storage consumption can be greatly reduced by sharing the static data. For ten rounds of game, storage occupancy after sharing the static data is 10% of storage occupancy without sharing the static data. When static resources are used by the multiple rounds of game, the static resources can be directly read from a shared memory and video memory.

In addition to multiplexing using of the static data, demultiplexing using of dynamic data can also be carried out, that is, dynamic refreshing of dynamic objects is continuously carried out, and the dynamic data composed of dynamic objects before refreshing is discarded each time dynamic refreshing is performed.

In a specific embodiment, it is assumed that there are ten rounds of game in progress:

1) The dynamic objects of the first round of game are first read, and the voxel, layer, and connection data are dynamically updated into the clean static data according to the above method. In this case, the dynamic data required for the first round of game is obtained, that is, the static data that has been written into the dynamic data.

2) An AI algorithm is run and a decision of an AI character in the first round of game is obtained, that is, a game process;

3) Restoring the dynamic data means erasing, to get the original clean static data for the next refreshing.

This process from the second round of game to the tenth round of game is carried out in turn. The above process is carried out several times per second to ensure that the AI characters in all games are acting normally when observed by the outside world.

In terms of occupied space, the size of dynamic data is about 100 MB, and the data can be discarded after running one round of game, that is, only one piece of dynamic data always occupies space, so that the occupied space is very small.

For the time taken, it takes tens of microseconds to refresh all the dynamic data for one round of game, it takes hundreds of microseconds (less than 1 millisecond) to refresh ten rounds of game, and there is almost no impact on fluency, and therefore a very high-precision anthropomorphic and very smooth AI environment can be obtained.

In the constructed voxel scene, the connection data between different voxel layers is used to implement the passage between different voxel layers on different base columns and different layers of adjacent base columns. In this way, object movement in the three-dimensional space is implemented.

For ease of understanding, a distance between every two base points (x, y) in the three-dimensional space can be understood as a movement unit for the character to move in a plane, and the movement unit is the minimum distance for the character to move in a plane. However, the passage between different voxel layers is based on the position changes at different heights, and therefore the passage between different voxel layers can change the altitude of the character in the scene. When the character moves from one base column to another base column which is at a distance of multiple base columns from the one base column, the character moves multiple movement units, and the multiple movement units constitute a moving path of the character.

Specifically, the present invention further provides a data processing method based on voxel data, navigation can be implemented in a three-dimensional space based on the voxel data. The method further includes the following steps:

A navigation path through which the operation object passes from a starting-point voxel layer to an ending-point voxel layer in the three-dimensional space is calculated according to the connection data. In the present invention, the navigation path not only includes path information from the starting-point voxel layer to the ending-point voxel layer, but also includes information of various passing manners used during the traveling process.

When the game character moves from one base column to another base column which is at a distance of multiple base columns away from the one base column, the game character moves multiple movement units, and the multiple movement units constitute a moving path of the game character. However, there are often multiple navigation paths between the starting-point voxel layer and the ending-point voxel layer, and the passing manners supported by the navigation paths are also different.

For example, in a game scene, if a character enters the house from the outside, he can choose to enter through the door or through the window, but he only needs to walk if he enters through the door, but he needs to jump if he enters through the window.

In addition, because the distance lengths of the navigation paths are different, the distance costs required for the operation object to pass through the navigation paths are also different. In addition, when the operation object passes through paths of the same distance length, the action costs required by the different passing manners adopted by the operation object are also different. In the game, at least two of the passing manners can be set to have different action costs. Certainly, it is also possible to set each passing manner has a different action cost. The distance cost is the cost required for the operation object to travel the distance corresponding to the navigation path; the action cost is the cost required for the operation object to travel the preset distance by adopting a preset passing manner. The cost can be understood as the energy value consumed by the action of the game character. The distance cost is related to the distance. The farther the distance, the greater the energy value consumed.

Without considering the action cost of the passing manner, a construction function of the distance cost of the game character when traveling can be a simple multiple relationship, for example, the energy value consumed for one kilometer is x, and the energy value consumed for two kilometers is 2x, and so on. Alternatively, the construction function of the distance cost can be a segmented multiple relationship. For example, for the first three kilometers, the energy value consumed for per kilometer is x, that is, the energy value consumed by traveling one kilometer is x, the energy value consumed by travelling two kilometers is 2x, and the energy value consumed by travelling three kilometers is 3x; from the third to the fifth kilometer, the energy value consumed for per kilometer is 2x, that is, the energy value consumed by traveling four kilometers is 5x (the energy value consumed for the first three kilometers is 3x, the energy value consumed for the fourth kilometer is 2x), and the energy value consumed by traveling five kilometers is 7x. The construction function of the distance cost may further be another functional relationship, and the energy value is obtained by calculation through the function formula.

For ease of understanding, a base plane can be understood as a chessboard, and each base column can be understood as a chessboard cell. A path between two chessboard cells can be a straight line or another polyline. Obviously, the traveling cost of a straight line is less than the traveling cost of a polyline.

According to an embodiment of the present invention, when the game character needs to move from one position to another position in the game, according to the voxel data in the three-dimensional space, a voxel layer of a current position of the game character can be determined and defined as the starting-point voxel layer, a position to be reached by the game character is determined and defined as the ending-point voxel layer, and a path with the smallest distance cost can be obtained by calculation according to the connection data as the navigation path for the game character to pass from the starting-point voxel layer to the ending-point voxel layer. In this embodiment, the navigation path is calculated by considering only the distance cost without considering the action cost when different passing manners are used, that is, the path with the shortest distance is obtained by calculation as the navigation path. For example, if an unlimited energy mode is set in the game (or it can be considered that the energy consumption function is disabled), there is no need to consider the action costs of different passing manners in this case. Alternatively, a time priority mode is set in the game, and priority is given to the passing time, that is, the path with the shortest distance is chosen as the navigation path.

According to another embodiment of the present invention, when the game character needs to pass from the starting-point voxel layer to the ending-point voxel layer, a path with the smallest sum of the distance cost and the action cost can be obtained by calculation according to the connection data as the navigation path. In the present invention, the first passing manner, the second passing manner, the third passing manner, the fourth passing manner, and the fifth passing manner respectively refer to upright walking, squatting, jumping, jetting and crawling forward, the action costs of the various passing manners may be different, or at least two of the various passing manners have different action costs, that is, the action costs of different passing manners may be the same but there are at least two kinds of action costs. In this embodiment, the action costs of walking upright, squatting, and crawling can be set to be the same in the game, the action cost of jumping is greater than that of walking upright, and the action cost of jetting is greater than that of jumping, that is, when the height of the obstacle jumped over is higher, the action cost of the passing manner adopted is greater, and the path with the minimum energy consumption value is obtained by calculation as the navigation path.

During the movement of the game character, it is determined whether the ending point is reached through the movement state, and it is determined whether the ending-point voxel layer is reached through the triggering of a task mechanism of the ending point. For the former determining, the movement state of the character is recorded, and when a current movement state shows that a voxel layer in which the game character is located is consistent with the ending-point voxel layer, it is considered that the ending point has been reached; commonly, determining is performed based on the distance, and when the distance that the game character needs to continue to move meets the requirements, for example, if the distance is 0, it is considered that the game character have reached the ending-point voxel layer. For the latter determining, the ending point is not determined by the movement state of the character, but the ending point is determined by the triggering of the task mechanism; when the task is successfully triggered, it is considered that the game character have reached the ending-point voxel layer.

Specifically, the ending-point voxel layer includes a no-task ending-point voxel layer and a task-containing ending-point voxel layer, and the number of no-task ending-point voxel layers is 1, that is, there is only one ending-point voxel layer limited by the distance, otherwise, multiple ending points appear. Certainly, in a special application scenario, the existence of multiple ending points is still supported. No limitation is set, and only preference is given herein. A distance cost between the current position of the operation object and the no-task voxel layer is obtained by calculation in real time. When the distance cost is 0, it is considered that the no-task ending-point voxel layer has been reached.

The number of task-containing ending-point voxel layers is greater than 1, and there are multiple ending-point voxel layers in different positions. When the operation object triggers a task in the current voxel layer, it is considered that the task-containing ending-point voxel layer has been reached.

Preferably, the task includes a shooting task and a treatment task.

When a distance between a current voxel layer in which the operation object is located and a target object does not exceed a preset distance, and a ray detection result is passable, a first task is triggered. That is, if a distance between a current position of the character and a shooting target (a target object) is within a designed shooting range, and there are no obstacles on a shooting path, the shooting task is triggered. Here, ray detection refers to calculating whether there is an obstacle between two points in the game scene by using a CPU or GPU. When the ray detection result is passable, it indicates that there is no obstacle, and when the ray detection result is impassable, it indicates that there is an obstacle. The target object may be a game object or may be a scene element, the game object may be a character controlled by a player or may be a character controlled by AI. During the ray detection process, if a solid point is detected, that is, an attribute value of the voxel coordinate point is 1, it indicates that the path is blocked or is impassable; if there is no solid point, that is, an attribute value of the voxel coordinate point is 0, it indicates that the path is unblocked and is passable. Specifics are as follows:

1) n points $(a_1, b_1, c_1), (a_2, b_2, c_2), \ldots, (a_n, b_n, c_n)$ through which a path from a starting point $(x_1, y_1, z_1)$ to an ending point $(x_2, y_2, z_2)$ needs to pass in the voxel scene are calculated by using a ray detection method. The ray detection method is performed as follows: A ray is sent from the starting point to the ending point, there is a line segment between the starting point and the ending point, and points on the line segment are the n points that need to be passed through.

2) The n points are put into an array A (the number of array elements is n, and each array element includes information about voxel scene coordinates, that is, information about three-dimensional coordinates (x, y, z)).

3) In the GPU, calculation is simultaneously performed for the points in the array A, that is, n threads are concurrent, and each thread performs the following process:

A point in voxel data is reached by indexing according to the coordinates in the voxel scene, and it is detected whether the point is a solid point. If a solid point is detected, 1 is written to a result, that is, a first detection result, and it indicates that a path corresponding to the thread is blocked. If no solid point is detected, 0 is written to a result, that is, a second detection result, and it indicates that a path corresponding to the thread is passable without an obstacle.

When a configuration parameter value of the operation object is lower than a preset configuration parameter value, and the current voxel layer in which the operation object is located has a configuration parameter supply for increasing the configuration parameter value, a second task, namely the treatment task, is triggered. The configuration parameter can be health points of the game character, and the configuration parameter supply can be a treatment pack, that is, when the health point of the character is lower than a certain value of the health point, and there is a treatment pack at the current location, the treatment task is triggered. The configuration parameter can also be the number of bullets, and the configuration parameter supply can be a clip.

Preferably, a cover scene is further required for the triggering of the treatment task, and the determining of covering is as follows: if a result of ray detection between the operation object and the target object is impassable, it is considered that covering exists. When the configuration parameter value of the operation object is lower than the preset configuration parameter value, the current voxel layer in which the operation object is located has a configuration parameter supply for increasing the configuration parameter, and a result of ray detection between the operation object and the target object is impassable, the treatment task triggered.

It should be noted that in some scenarios, treatment can only be performed if there is a treatment pack at the ending point. However, in some scenarios, the treatment can be chosen independently, for example, the game character carries a treatment pack in the equipment carried by the game character, but the support of the cover scene is needed. Therefore, the present invention does not limit whether the ending-point voxel layer has a treatment pack or not.

The target object is an object that can interact with the operation object, and can be understood as an enemy character that can shoot at the operation object to damage the operation object. According to the present embodiment, treatment can be performed only when the game character is safe.

Because the target object is a dynamic object, it is necessary to detect a cover state in real time. Because a calculation speed of voxel data is very fast, the update of the cover state is also very timely, so that the game process is very smooth.

Multiple navigation examples of the game scene are provided below.

The game character starts off at a certain point, and the purpose is to reach a position at which the game character can shoot at the target and perform shooting:

1) The game character starts to explore a node and its surrounding nodes. Because the distance cost of walking is the lowest, if it is found that walking is allowed, walking is chosen.

2) The game character continues to explore a successor node and its surrounding nodes. Because the cost of walking multiple times is higher than jumping, if it is found that walking and jumping are all allowed, but a detour needs to be made for the node for which walking is allowed, jumping is chosen.

3) The game character continues to explore a successor node and its surrounding nodes. If it is found that jetting can allow the game character to reach a node, where multiple times of walking and jumping are required to reach the node and the node is closer to the target, jetting is chosen.

4) The game character continues to explore a successor node and its surrounding nodes. If it is found that a certain node enters the target range and the ray detection is passable, a decision of shooting is made.

Because the health point of the game character is relatively low, another navigation decision is triggered. The game character starts at the current node, and the purpose is to reach a place where the game character can be covered and treated:

1) The game character starts to explore a node and its surrounding nodes. Because the distance cost of walking is the lowest, if it is found that walking is allowed, walking is chosen.

2) The game character continues to explore a successor node and its surrounding nodes. Because the cost of walking multiple times is higher than jumping, if it is found that walking and jumping are all allowed, but a detour needs to be made for the node for which walking is allowed, jumping is chosen.

3) The game character continues to explore a successor node and its surrounding nodes. If it is found that jetting can allow the game character to reach a node, where multiple times of walking and jumping are required to reach the node and the node is closer to the target, jetting is chosen.

4) The game character finds a certain node, and the target ray detection between the game character and this node is impassable, which means that other game characters at this node cannot see this game character, and the other game characters at this node cannot interact with this game character to perform attacking, that is, a decision of treatment is chosen.

In the above embodiment, it is mentioned that the cover scene is required for the triggering of the treatment task, and it can easily think of a situation in which the cover scene is required during the process of completing the shooting task or in the process of going to the no-task voxel layer, that is, the result of ray detection between the operation object and the target object can be calculated in real time, and the path and the passing manner that can provide the cover scene are selected.

It should be noted that the game character and the operation object mentioned in the present invention can be understood as different expressions of the same object, and different expressions are more conducive to comprehensive understanding in different scenarios.

The invention further discloses a data processing system based on voxel data, and the system includes a point capturing module, a comparison indexing module, a voxel layer data construction module, and a connection data construction module.

The point capturing module takes a base plane of z=z' in a x, y, z three-dimensional space, where there are multiple base points (x, y, z') on the base plane; the point capturing module forms multiple base columns by taking the base point as a bottom point and using a z coordinate as a height, where there are L element points (x, y, z) on each base column.

The comparison indexing module accesses the base columns in parallel in a GPU, traverses each element point on the base column in each parallel thread, reaches a voxel point corresponding to the element point by indexing according to the voxel data, and determines whether the voxel point is a hollow point or a solid point.

The voxel layer data construction module collects a continuous hollow point segment 100 on each base column, and if a height of the continuous hollow point segment 100 is greater than or equal to a first preset height, defines the continuous hollow point segment 100 as a voxel layer.

The connection data construction module obtains a positional relationship between each voxel layer on each base column and each voxel layer on the adjacent base column by calculation, and if there is an overlapping part between the two voxel layers in a height direction, considers that there is connection data between the two voxel layers, so that an operation object passes between the two voxel layers; the voxel point, the voxel layer; and the connection data constitute a three-dimensional space based on voxel data.

The system includes a hardware structure and a computer-readable storage medium. The above functional modules may be integrated on the hardware structure or on the computer-readable storage medium, which is not limited here. Moreover, the connection relationship of the above functional modules may be a tangible connection or an intangible cross-regional connection, which is not limited here. In addition, the system and the corresponding method embodiments belong to the same idea, and its specific implementation process is detailed in the corresponding method embodiments, which will not be repeated here.

The invention also discloses a data processing server based on voxel data, and the server includes a point capturing module, a comparison indexing module, a voxel layer data construction module and a connection data construction module.

The point capturing module takes a base plane of z=z' in a x, y, z three-dimensional space, where there are multiple base points (x, y, z') on the base plane; the point capturing module forms multiple base columns by taking the base point as a bottom point and using a z coordinate as a height, where there are L element points (x, y, z) on each base column.

The comparison indexing module accesses the base columns in parallel in a GPU, traverses each element point on the base column in each parallel thread, reaches a voxel point corresponding to the element point by indexing according to the voxel data, and determines whether the voxel point is a hollow point or a solid point.

The voxel layer data construction module collects a continuous hollow point segment 100 on each base column, and if a height of the continuous hollow point segment 100 is greater than or equal to a first preset height, defines the continuous hollow point segment 100 as a voxel layer.

The connection data construction module obtains a positional relationship between each voxel layer on each base column and each voxel layer on the adjacent base column by calculation, and if there is an overlapping part between the two voxel layers in a height direction, considers that there is connection data between the two voxel layers, so that an operation object passes between the two voxel layers; and the voxel point, the voxel layer, and the connection data constitute a three-dimensional space based on voxel data.

The present invention further discloses a computer-readable storage medium storing instructions for data processing based on voxel data, and the following steps are performed when the instructions are executed:

In a x, y, z three-dimensional space, a base plane of z=z' is taken, where there are multiple base points (x, y, z') on the base plane; and multiple base columns are formed by using the base point as a bottom point and using a z coordinate as a height, where there are L element points (x, y, z) on each base column.

The base columns are accessed in parallel in a GPU, each element point on the base column is traversed in each parallel thread, a voxel point corresponding to the element point is reached by indexing according to the voxel data, and it is determined whether the voxel point is a hollow point or a solid point.

A continuous hollow point segment 100 on each base column is collected, and if a height of the continuous hollow point segment 100 is greater than or equal to a first preset height, the continuous hollow point segment 100 is defined as a voxel layer.

A positional relationship between each voxel layer on each base column and each voxel layer on the adjacent base column is obtained by calculation, and if there is an overlapping part between the two voxel layers in a height direction, it is considered that there is connection data between the two voxel layers, so that an operation object passes between the two voxel layers; and the voxel point, the voxel layer, and the connection data constitute a three-dimensional space based on voxel data.

The computer-readable storage medium can be integrated in hardware, and when the hardware is running, the computer-readable storage medium can be supported to read and run.

In addition, the computer-readable storage medium and the corresponding method embodiments belong to the same idea. For details of a specific implementation process, refer to the corresponding method embodiments. Details are not described herein.

The present invention further discloses a computer program product, including computer-executable instructions, and the instructions are executed by a processor to implement the following steps:

In a x, y, z three-dimensional space, a base plane of z=z' is taken, where there are multiple base points (x, y, z') on the base plane; and multiple base columns are formed by using the base point as a bottom point and using a z coordinate as a height, where there are L element points (x, y, z) on each base column.

The base columns are accessed in parallel in a GPU, each element point on the base column is traversed in each parallel thread, a voxel point corresponding to the element point is reached by indexing according to the voxel data, and it is determined whether the voxel point is a hollow point or a solid point.

A continuous hollow point segment 100 on each base column is collected, and if a height of the continuous hollow point segment 100 is greater than or equal to a first preset height, the continuous hollow point segment 100 is defined as a voxel layer.

A positional relationship between each voxel layer on each base column and each voxel layer on the adjacent base column is obtained by calculation, and if there is an overlapping part between the two voxel layers in a height direction, it is considered that there is connection data between the two voxel layers, so that an operation object passes between the two voxel layers; and the voxel point, the voxel layer; and the connection data constitute a three-dimensional space based on voxel data.

In addition, the computer program product and the corresponding method embodiments belong to the same idea. For details of a specific implementation process, refer to the corresponding method embodiments. Details are not repeated herein.

It should be noted that the embodiments of the present invention have better implementations and do not limit the present invention in any form. Any person skilled in the art may use the technical content disclosed above to change or modify equivalent effective embodiments. However, any amendments or equivalent changes and modifications made to the above embodiments based on the technical essence of the present invention without departing from the content of the technical solution of the present invention still fall within the scope of the technical solution of the present invention.

The invention claimed is:

1. A data processing method based on voxel data, wherein the data processing method comprises the following steps:

in a x, y, z three-dimensional space, taking a base plane of z=z', wherein there are multiple base points on the base plane; and forming multiple base columns by using a base point as a bottom point and using a z coordinate as a height, wherein there are L element points on each base column;

accessing the multiple base columns in parallel in a graphic processing unit (GPU), traversing each element point on each base column in each parallel thread, reaching a voxel point corresponding to that element point by indexing according to the voxel data, and determining whether the voxel point is a hollow point or a solid point;

collecting a continuous hollow point segment on each base column, and if a height of the continuous hollow point segment is greater than or equal to a first preset height, defining the continuous hollow point segment as a voxel layer; and obtaining a positional relationship between each voxel layer on each base column and each voxel layer on an adjacent base column by calculation, and if there is an overlapping part between two voxel layers in a height direction, determining that there is connection data between the two voxel layers, so that an operation object passes between the two voxel layers;

wherein the voxel point, the two voxel layers, and the connection data constitute a three-dimensional space based on the voxel data.

2. The data processing method according to claim 1, wherein if a height of the overlapping part is smaller than the first preset height, determining that the connection data is impassable, and indicating that the operation object cannot pass between the two voxel layers; and if the height of the overlapping part is greater than or equal to the first preset height, determining that the connection data is passable, and indicating that the operation object can pass between the two voxel layers.

3. The data processing method according to claim 2, wherein the first preset height is greater than or equal to a height of the operation object, and the two voxel layers comprise a first voxel layer and a second voxel layer, a height of a lowest element point of the first voxel layer is n, and a height of a lowest element point of the second voxel layer is f, wherein:

if the height of the overlapping part is greater than or equal to the first preset height, and f-nga second preset height, determining that the connection data is first passable data, and indicating that a manner in which the operation object passes from the first voxel layer to the second voxel layer comprises a first passing manner and a second passing manner;

if the height of the overlapping part is greater than or equal to the first preset height, and the second preset height<f−n<a third preset height, determining that the connection data is second passable data, and indicating that the manner in which the operation object passes from the first voxel layer to the second voxel layer comprises a third passing manner; and if the height of the overlapping part is greater than or equal to the first preset height, and the third preset height<f−n<a fourth preset height, determining that the connection data is third passable data, and indicating that the manner in which the operation object passes from the first voxel layer to the second voxel layer comprises a fourth passing manner.

4. The data processing method according to claim 3, wherein the first passable data indicates that the manner in which the operation object passes from the first voxel layer to the second voxel layer further comprises a fifth passing manner.

5. The data processing method according to claim 2, wherein the operation object has a first posture and a second posture, a posture height of the first posture is greater than a posture height of the second posture, and the operation object further has a first action manner and a second action manner, the first preset height is greater than or equal to the posture height of the second posture of the operation object, and the two voxel layers comprise a first voxel layer and a second voxel layer, a height of a lowest element point of the first voxel layer is n, and a height of a lowest element point of the second voxel layer is f, wherein:

if the height of the overlapping part>the posture height of the first posture, and f−n≤a second preset height, determining that the connection data is fourth passable data, and indicating that when the operation object passes from the first voxel layer to the second voxel layer, the operation object performs the first posture, the second posture, and the first action manner;

if the posture height of the first posture>the height of the overlapping part≥the posture height of the second posture, and f−n≤the second preset height, determining that the connection data is fifth passable data, and indicating that when the operation object passes from the first voxel layer to the second voxel layer, the operation object performs the second posture, and the first action manner;

if the height of the overlapping part≥the posture height of the first posture, and the second preset height<f−n≤a third preset height, determining that the connection data is sixth passable data, and indicating that when the operation object passes from the first voxel layer to the second voxel layer, the operation object performs the first posture, and the second action manner; and if the posture height of the first posture>the height of the overlapping part≥the posture height of the second posture, and the second preset height<f−n≤the third preset height, determining that the connection data is seventh passable data, and indicating that when the operation object passes from the first voxel layer to the second voxel layer, the operation object performs the second posture, and the second action manner.

6. The data processing method according to claim 5, wherein the operation object further has a third action manner, wherein:

if the height of the overlapping part≥the posture height of the first posture, and the third preset height<f−n≤a fourth preset height, determining that the connection data is eighth passable data, and indicating that when the operation object passes from the first voxel layer to the second voxel layer, the operation object performs the first posture, and the third action manner.

7. The data processing method according to claim 5, wherein the operation object further has a third posture, a posture height of the third posture is less than the posture height of the second posture, and the first preset height is greater than or equal to the posture height of the third posture of the operation object, wherein:

the fourth passable data indicates that when the operation object passes from the first voxel layer to the second voxel layer, the operation object performs the third posture;

the fifth passable data indicates that when the operation object passes from the first voxel layer to the second voxel layer, the operation object performs the third posture;

if the posture height of the second posture>the height of the overlapping part≥the posture height of the third posture, and f−n≤the second preset height, determining that the connection data is ninth passable data, and indicating that when the operation object passes from the first voxel layer to the second voxel layer, the operation object performs the third posture, and the first action manner.

8. The data processing method according to claim 1, wherein the data processing method further comprises the steps of:

calculating a navigation path through which the operation object passes from a starting-point voxel layer to an ending-point voxel layer in the three-dimensional space based on the voxel data according to the connection data.

9. The data processing method according to claim 8, wherein the navigation path obtained by calculation is a path with a shortest distance or a distance cost that is smallest, and the distance cost is a cost required for the operation object to pass through a distance corresponding to the navigation path; or, the navigation path obtained by calculation is a path with an action cost that is smallest, and the action cost is a cost required for the operation object to take a passing manner; or, the navigation path obtained by calculation is a path that a sum of the distance cost and the action cost is smallest.

10. The data processing method according to claim 9, wherein, the ending-point voxel layer comprises a task-free ending-point voxel layer and a task-containing ending-point voxel layer, wherein:

the distance cost between a current position of the operation object and the task-free ending-point voxel layer is obtained by calculation in real time, and when the distance cost obtained by calculation is 0, the operation object has reached the task-free ending-point voxel layer; and when the operation object triggers a task at a current voxel layer, the task-containing ending-point voxel layer has been reached.

11. The data processing method according to claim 10, wherein the task comprises a first task and a second task; and that when the task-containing ending-point voxel layer has been reached comprises:

when a distance between the operation object and a target object does not exceed a preset distance and a ray detection result is passable, the first task is triggered, and the target object is an object capable of interacting with the operation object; and when a configuration parameter value of the operation object is lower than a preset parameter value, and the current voxel layer in which the operation object is located has a configuration parameter supply for increasing the configuration parameter value, the second task is triggered.

12. The data processing method according to claim 11, wherein that when the configuration parameter value of the operation object is lower than the preset parameter value, and the current voxel layer in which the operation object is located has the configuration parameter supply for increasing the configuration parameter value, the second task is triggered comprises:

when the configuration parameter value of the operation object is lower than the preset parameter value, and the current voxel layer in which the operation object is located has the configuration parameter supply, and when a result of ray detection between the operation object and the target object is impassable, the second task is triggered.

13. The data processing method according to claim 1, wherein the three-dimensional space based on the voxel data is applied to a game scene, original data of the game scene constitutes a pixel scene, the pixel scene comprises multiple different data types of scene elements, and the original data of the multiple different data types of the scene elements is exported respectively;

an expected side length of a unit voxel is set, and combined with a given side length of the unit voxel, the original data of the multiple different data types of the scene elements is converted into the voxel data respectively, wherein the voxel data represented in the game scene is represented as a voxel module; and according to relative positions of voxel modules of all the scene elements in the pixel scene, the voxel modules of all the scene elements are spliced to obtain a voxel scene.

14. The data processing method according to claim 13, wherein the game scene comprises a dynamic object, and types of all dynamic objects and offset coordinates of a contour point of each of different types of dynamic objects relative to a center point of the dynamic object are obtained;

update coordinates of the contour point to be refreshed are obtained by calculation according to coordinates of the center point of the dynamic object to be refreshed and the offset coordinates of the contour point; and writing is performed at update positions of all contour points after the dynamic object is refreshed, and erasing is performed for original positions of all contour points before the dynamic object is refreshed, so as to complete dynamic refreshing of the dynamic object.

15. The data processing method according to claim 14, wherein the game scene further comprises a static object; during a game, a set of static data composed of the static object is reused, and dynamic refreshing of the dynamic object is continuously performed, and dynamic data composed of the dynamic object before refreshing is discarded each time dynamic refreshing is performed.

16. The data processing method according to claim 15, wherein the scene elements of the game scene comprise terrain, vegetation, a building, and an outdoor decoration;

the exporting the original data of the multiple different data types of the scene elements respectively comprises:

exporting 3D model file format data and coordinate information of the outdoor decoration and the building; exporting comma-separated value file format data of the vegetation; and orthogonally capturing by a depth camera to export a picture of the terrain, wherein the picture comprises surface height data of the terrain; and the setting the expected side length of the unit voxel, and combined with the given side length of the unit voxel, converting the original data of the multiple different data types of the scene elements into the voxel data respectively comprises:

converting the 3D model file format data of the outdoor decoration and the building into the voxel data; obtaining a size of a collision body of the vegetation, combined with the given side length of the unit voxel, obtaining a quantity of voxels that the vegetation needs to occupy in the voxel scene and a voxel shape by calculating; and according to the picture in which the surface height data of the terrain is stored, performing sampling point by point according to the given side length of the unit voxel to convert the surface height data of the terrain into the voxel data.

17. A data processing server based on voxel data, wherein the data processing server comprises a point capturing module, a comparison indexing module, a voxel layer data construction module and a connection data construction module;

the point capturing module takes a base plane of $z=z'$ in a x, y, z three-dimensional space, wherein there are multiple base points on the base plane; the point capturing module forms multiple base columns by taking a base point as a bottom point and using a z coordinate as a height, wherein there are L element points on each base column;

the comparison indexing module accesses the multiple base columns in parallel in a graphics processing unit (GPU), traverses each element point on each base column in each parallel thread, reaches a voxel point corresponding to that element point by indexing according to the voxel data, and determines whether the voxel point is a hollow point or a solid point;

the voxel layer data construction module collects a continuous hollow point segment on each base column, and if a height of the continuous hollow point segment is greater than or equal to a first preset height, defines the continuous hollow point segment as a voxel layer; and the connection data construction module obtains a positional relationship between each voxel layer on each base column and each voxel layer on an adjacent base column by calculation, and if there is an overlapping part between two voxel layers in a height direction, determines that there is connection data between the two voxel layers, so that an operation object passes between the two voxel layers; wherein the voxel point, the two voxel layers, and the connection data constitute a three-dimensional space based on the voxel data.

18. A non-transitory computer-readable storage medium, storing instructions for data processing based on voxel data, wherein the instructions implement the following steps when executed by a processor:

in a x, y, z three-dimensional space, taking a base plane of z=z', wherein there are multiple base points on the base plane; and forming multiple base columns by using a base point as a bottom point and using a z coordinate as a height, wherein there are L element points on each base column;

accessing the multiple base columns in parallel in a graphics processing unit (GPU), traversing each element point on each base column in each parallel thread, reaching a voxel point corresponding to that element point by indexing according to the voxel data, and determining whether the voxel point is a hollow point or a solid point;

collecting a continuous hollow point segment on each base column, and if a height of the continuous hollow point segment is greater than or equal to a first preset height, defining the continuous hollow point segment as a voxel layer; and obtaining a positional relationship between each voxel layer on each base column and each voxel layer on an adjacent base column by calculation, and if there is an overlapping part between two voxel layers in a height direction, determining that there is connection data between the two voxel layers, so that an operation object passes between the two voxel layers;

wherein the voxel point, the two voxel layers, and the connection data constitute a three-dimensional space based on the voxel data.

19. A computer program product embodied in a non-transitory computer-readable storage medium, comprising a computer-executable instruction, wherein the computer-executable instruction is executed by a processor to implement the following steps:

in ax, y, z three-dimensional space, taking a base plane of z=z', wherein there are multiple base points on the base plane; and forming multiple base columns by using a base point as a bottom point and using a z coordinate as a height, wherein there are L element points on each base column;

accessing the multiple base columns in parallel in a graphics processing unit (GPU), traversing each element point on each base column in each parallel thread, reaching a voxel point corresponding to that element point by indexing according to voxel data, and determining whether the voxel point is a hollow point or a solid point;

collecting a continuous hollow point segment on each base column, and if a height of the continuous hollow point segment is greater than or equal to a first preset height, defining the continuous hollow point segment as a voxel layer; and obtaining a positional relationship between each voxel layer on each base column and each voxel layer on an adjacent base column by calculation, and if there is an overlapping part between two voxel layers in a height direction, determining that there is connection data between the two voxel layers, so that an operation object passes between the two voxel layers;

wherein the voxel point, the two voxel layers, and the connection data constitute a three-dimensional space based on the voxel data.

\* \* \* \* \*